UNITED STATES PATENT OFFICE.

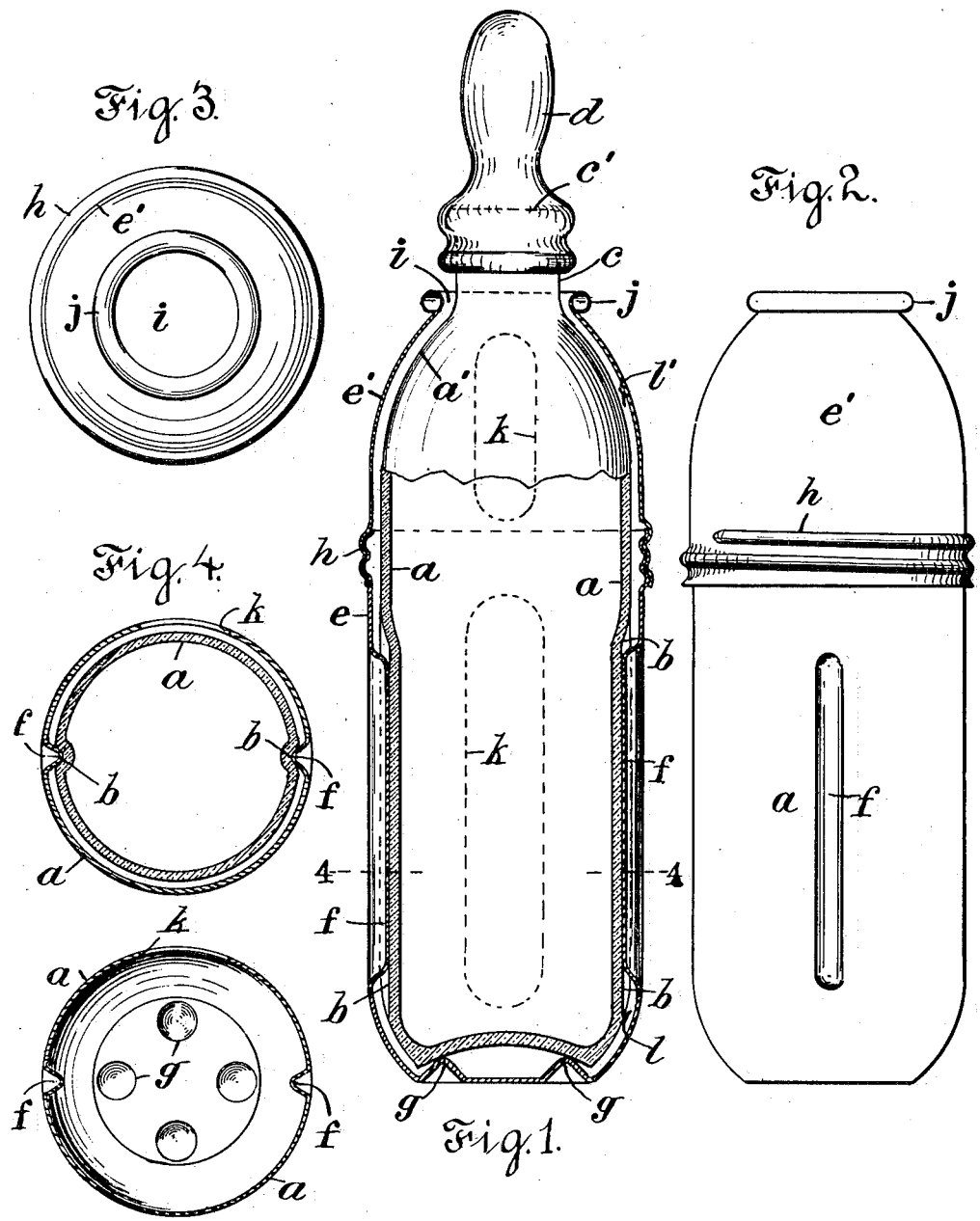

CHARLES C. GOSS, OF NEW YORK, N. Y.

CASING FOR NURSING AND OTHER BOTTLES.

1,121,349.   Specification of Letters Patent.   Patented Dec. 15, 1914.

Application filed April 23, 1914. Serial No. 833,850.

*To all whom it may concern:*

Be it known that I, CHARLES C. GOSS, a citizen of the United States, residing at 157 West One Hundred and Twentieth street, New York, county of New York, and State of New York, have invented certain new and useful Improvements in Casings for Nursing and other Bottles, fully described and represented in the following specification and the accompanying drawings, forming a part of the same.

The invention relates to a means for inclosing a bottle in a protective casing, by which it may be prevented from breakage in case of a fall or contact with a hard object, and the invention is especially applicable to nursing bottles for infants, which are liable to be thrown upon the floor or subjected to other abuse which might cause its breakage.

The invention consists of a sheet-metal casing divided transversely, one part embracing the body of the bottle and the other part inclosing the reduced portion connected with the neck or mouth of the bottle, and a screw-coupling connecting the two parts detachably together, so that they can be separated for the removal of the bottle when required, and the lower half of the casing having ribs fitted to grooves in the body of the bottle. It is found that the casing is more effective in protecting the bottle from injury if it is held a little way from the surface of the bottle, by projections which produce an elastic yielding of the casing between few points of contact, when in collision with any other object. I therefore form the lower part of the casing with longitudinal ribs which engage longitudinal grooves in the sides of the bottle and hold the casing clear from the glass intermediate to such ribs. The glass is held away from the inner wall of the casing at all points, and the casing is thus adapted, intermediate to the ribs, to yield elastically to any blow. Two of the ribs upon opposite sides of the casing are sufficient to hold the bottle therein, as the ribs are proportioned to crowd tightly into the grooves of the bottle and are held elastically therein by the elasticity of the bottle-casing, which is made of thin sheet-metal.

The construction will be understood by reference to the annexed drawing, which shows the invention applied to a nursing-bottle.

Figure 1 is a longitudinal section of the casing with the bottle therein; its walls being shown partly in section where hatched; Fig. 2 is an external view of the casing; Fig. 3 is a plan of the cap or upper end of the casing; Fig. 4 is a section of the casing and bottle on line 4—4 in Fig. 1; and Fig. 5 is a section of the casing upon the same line looking downward toward the bottom.

The lower part $e$ of the casing is fitted very loosely over the body of the bottle nearly to the reduced portion $a'$ which connects the neck $c$ with the body $a$, and the cap $e'$ or upper part of the casing is fitted loosely over such reduced portion $a'$ and is connected with the lower part $e$ by threads $h$ pressed in the sheet-metal of both parts to form a detachable coupling. The upper part of the cap has a central aperture $i$ of sufficient size to clear the collar $c'$ at the mouth of the bottle, so that it can be passed over such collar, and is disposed just below the point to which the nipple reaches upon the neck of the bottle, to permit the convenient application and removal of the nipple. A bead $j$ is formed around the margin of the aperture $i$ to form a smooth finish. The contact of the casing with the bottle is confined to the lower part $e$ which is formed with ribs $f$ pressed inwardly to engage grooves $b$ in the bottle. Two ribs and grooves are sufficient, one upon each side of the bottle, and such ribs form an empty space $l$ between the bottle and the casing, or hold the casing wholly clear of the glass, as shown in Figs. 1 and 4. A blow upon the casing cannot therefore produce a direct shock upon the glass as the casing does not contact therewith, and the casing thus protects the bottle from injurious effects of accidental blows. The grooves in the glass are open at the bottom to fit over the upper ends of the ribs when the bottle is inserted in the casing-part $e$, and such grooves terminate near the tops of the ribs, which are pressed inward to such a degree that the bottle is crowded between them when inserted in the casing and is held firmly therein.

The cap $e'$ of the casing is constructed to clear the reduced portion of the bottle by an empty space $l'$, and it is immaterial whether or not such cap be provided with any bosses or other projections to hold it clear from the glass, as the bottle is held elastically by the ribs *f*; and the cap of the casing, as well as its lower part, may thus be held in the desired relation to the bottle.

Having thus set forth the nature of the invention what is claimed herein is:

1. The combination, with a bottle reduced at the neck, of an elastic sheet-metal casing formed in two parts connected by a screw-coupling, the lower part fitted to clear the body of the bottle and the cap or upper part adapted to inclose the reduced portion, the lower part having longitudinal ribs bent inwardly therefrom and the bottle having corresponding grooves fitted snugly to such ribs and operating to hold the casing wholly clear from the bottle intermediate to the ribs.

2. The combination, with a bottle reduced at the neck and provided with a collar thereat, of an elastic sheet-metal casing formed in two parts connected by a screw-coupling, the lower part fitted to clear the body of the coupling and the cap or upper part constructed to wholly clear the reduced portion and having a beaded aperture to pass over the collar upon the neck, the lower part having longitudinal ribs bent inwardly therefrom, and the bottle having corresponding grooves fitted snugly to such ribs and operating to hold the entire casing clear from the bottle intermediate to the ribs.

In testimony whereof I have hereunto set my hand in the presence of two subscribing witnesses.

CHARLES C. GOSS.

Witnesses:
 WILLIAM HORAN,
 THOMAS S. CRANE.